Oct. 18, 1932.    R. ARMSTRONG    1,883,453
TUBE CUTTING DEVICE
Filed May 27, 1931    3 Sheets-Sheet 1
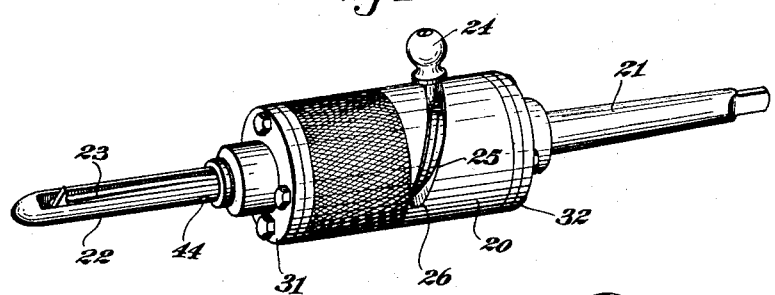
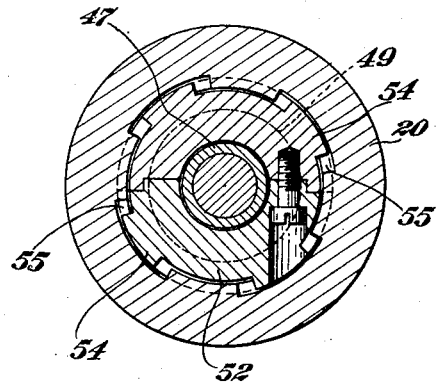 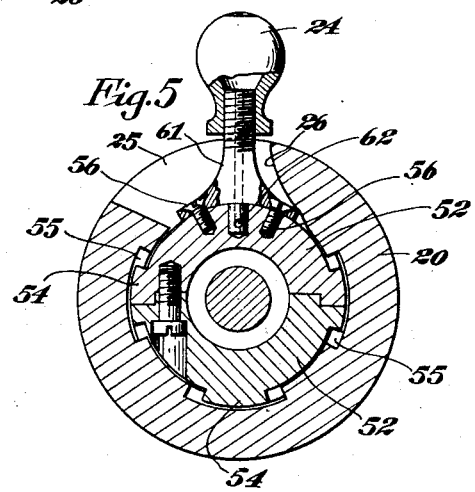
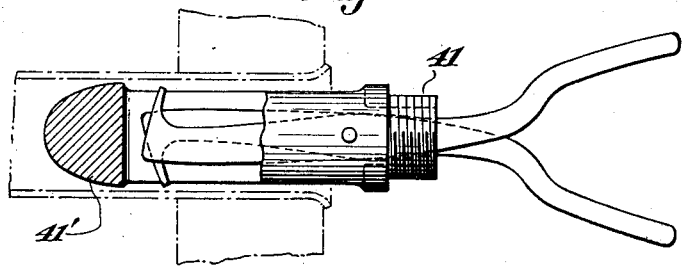
INVENTOR
Robert Armstrong,
BY
Frederick Breitenfeld
ATTORNEY Oct. 18, 1932.  R. ARMSTRONG  1,883,453
TUBE CUTTING DEVICE
Filed May 27, 1931  3 Sheets-Sheet 2
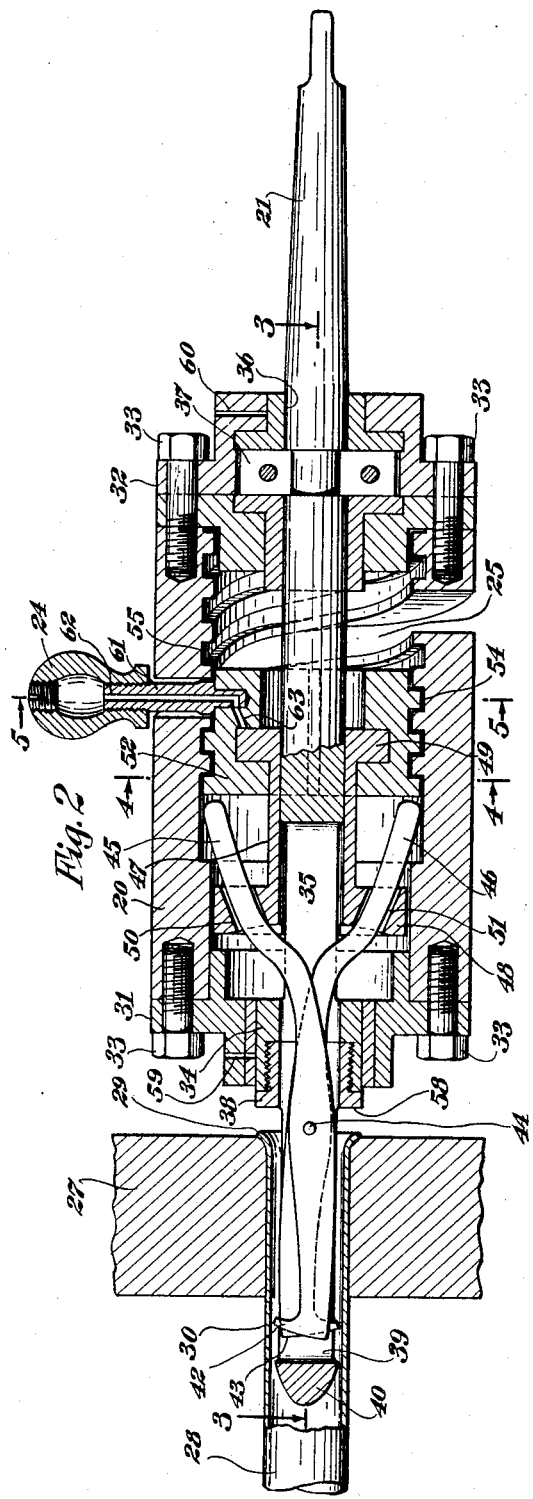
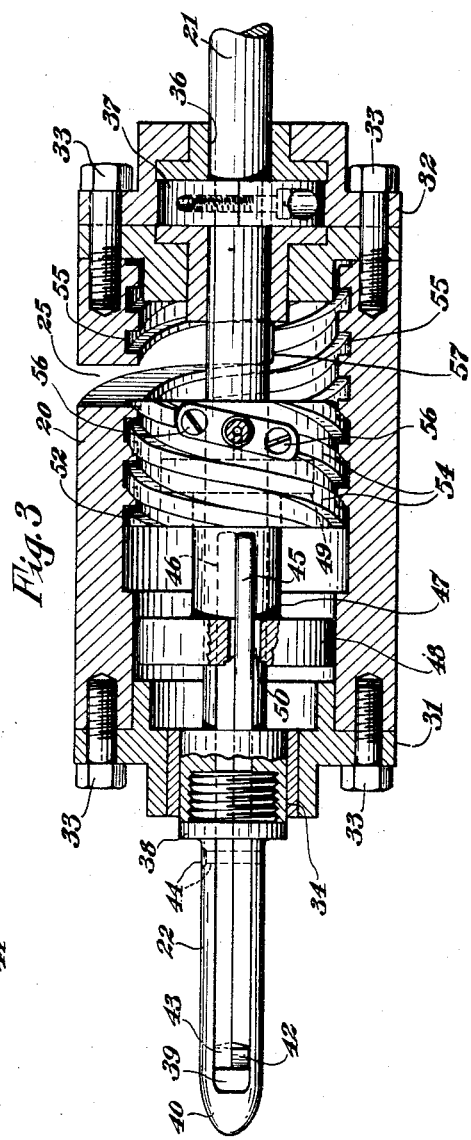
INVENTOR
Robert Armstrong,
BY
Frederick Breitenfeld
ATTORNEY Oct. 18, 1932.  R. ARMSTRONG  1,883,453
TUBE CUTTING DEVICE
Filed May 27, 1931  3 Sheets-Sheet 3
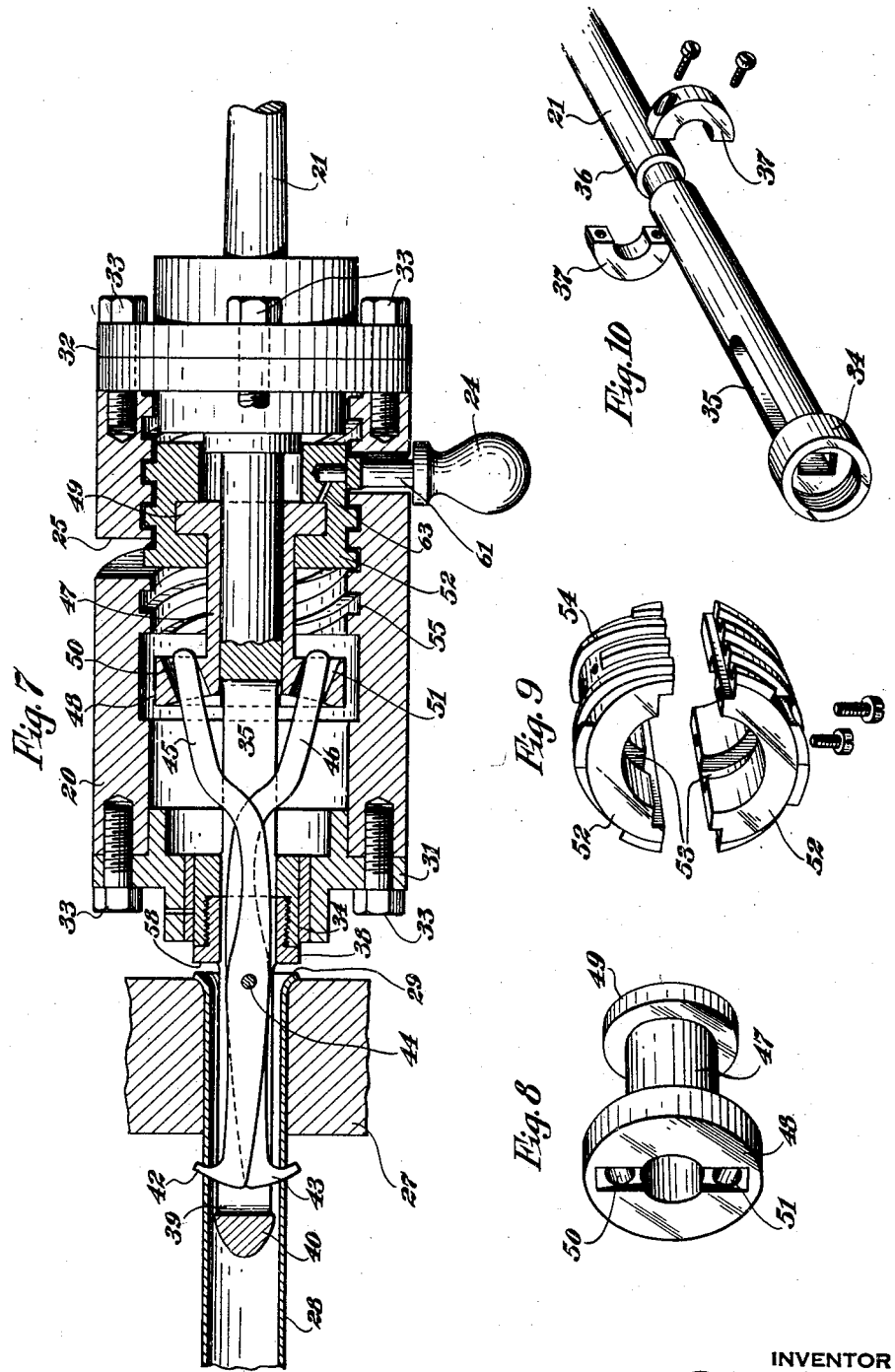
INVENTOR
Robert Armstrong,
BY
Frederick Breitenfeld
ATTORNEY Patented Oct. 18, 1932

1,883,453

UNITED STATES PATENT OFFICE

ROBERT ARMSTRONG, OF RIDGEFIELD, NEW JERSEY

TUBE CUTTING DEVICE

Application filed May 27, 1931. Serial No. 540,372.

My present invention relates generally to tools, and has particular reference to a tool or device for cutting condenser tubes or the like.

Although I have illustrated and shall hereinafter describe my invention as it may be applied to a tool designed for the cutting of tubes from a surface condenser, nevertheless it will be understood that as to certain phases of my invention a specific application of this character is not essential.

Before proceeding to describe my invention in detail, I will premise that a surface condenser comprises a series of tubes arranged in a parallel group, these tubes being supported at their ends by two tube sheets, each of which forms the inner wall of a chamber. Water is usually directed into the bottom of one chamber, passing thence through certain of the tubes to the other chamber, and thence back through to the tubes to the first chamber, and out. After a certain period of use, the tubes are likely to become worn or corroded and have to be replaced. My present invention relates to a tube cutter with facilitates the withdrawal of such tubes.

In my Patent No. 1,717,487, issued June 18, 1929, I have described a tube pulling tool which may be applied to one end of a tube of the character mentioned to grip the tube from within; and also to grip the packing, if any, which surrounds the tube; and thereupon to impart a forceful yank to the tube to dislodge the same from the tube sheets. In employing a pulling device of this character, the initial yank is usually sufficient to permit a single workmen thereafter to pull the tube by hand lengthwise out of its position. But this procedure is feasible only where the rear end of the tube is unburred and substantially smooth. Where the rear end is rolled into association with the rear tube sheet, the withdrawal of the tube is rendered difficult because the enlargement at the rear end will not readily pass through the intermediate supports of the tube.

It is a general object of my present invention to provide a cutting tool which may be applied to a tube of the foregoing character at the rear end thereof to cut the tube just inside of the rear tube sheet, whereby the tube may thereupon be withdrawn with ease after the forward end has been dislodged, as, for example, by means of a tube puller of the kind described in my aforesaid patent. The rear fragment of the tube, left in the rear tube sheet by the present cutter, may be withdrawn with comparative ease and discarded.

A tube cutter of the present kind must be sufficiently compact to be readily manipulated within the relatively small space available within the rear chamber of the condenser, and it must be provided with cutting means of competent strength to accomplish the desired objects.

One of the main features of my invention lies in providing a tube cutter of great compactness and of comparatively great power and which may be conveniently manipulated by a single operator with great ease and facility. Briefly, my invention comprises a substantially cylindrical housing having a spindle journaled therein, the rear end of the spindle being adapted to be driven by any suitable power source such as an electric motor of the character used in portable drilling machines or the like, and the forward end of the spindle constituting an operative head which may be inserted into the rear end of the tube to be cut. Associated with the operative end of the spindle is a cutter or cutters adapted to rotate with the spindle.

One of the features of my invention lies in providing an arrangement whereby the cutter is normally disposed in retracted position, as, for example, within the confines of a slot in the operative end of the spindle, the cutter being mounted for radial emergence from the slot. One of the difficulties I have had to overcome lies in the provision of a convenient manually operable means for accurately controlling the radial movement of the cutter or cutters, and for enabling a single operator to effect this movement with sufficient leverage to cause the cutter or cutters to work their way rapidly and efficiently through the wall of the tube which is being cut. Another difficulty lay in the necessity for providing an arrangement of this character which could be operated while the cutter or cutters are rotating at a relatively rapid rate.

Another feature of my invention lies in providing a device which may be employed with tubes of differing sizes, which is relatively simple to manufacture and comparatively light in weight, and which is smooth-operating and provided with efficient means for lubricating those parts which require it.

I achieve the foregoing objects, and such other objects as may hereinafter appear or be pointed out, in the manner illustratively exemplified in the accompanying drawings, wherein—

Figure 1 is a perspective view of a tube cutter of the present character;

Figure 2 is an enlarged, longitudinal, cross-sectional view showing the manner in which the tube cutter is associated with a tube to be cut;

Figure 3 is a longitudinal cross-section taken substantially along the line 3—3 of Figure 2;

Figure 4 is a transverse section taken substantially along the line 4—4 of Figure 2;

Figure 5 is a view similar to Figure 4, taken substantially along the line 5—5 of Figure 2;

Figure 6 is a side view of an operative cutting head adapted to be used, when desired, in cutting a tube of diameter larger than that shown in Figure 2;

Figure 7 is a cross-sectional view similar to Figure 2, showing the parts in the relationship they assume after the tube has been cut;

Figure 8 is a perspective view of one of the elements of the device;

Figure 9 is an exploded view of other elements of the device; and

Figure 10 is a fragmentary perspective view of a portion of the spindle with a thrust collar shown in exploded relationship.

Figure 1 will show that my device consists essentially of a substantially cylindrical housing 20 within which a spindle is journaled for rotation with respect to the housing. The rear end 21 of the spindle is adapted to be connected to any suitable power source such as an electric motor of the character mentioned. The forward end 22 of the spindle constitutes an operative head which is provided with one or more cutters designated generally by the reference numeral 23. The cutters are controlled by any suitable means on the exterior of the housing 20, and I have illustratively shown a construction wherein a manually graspable handle or knob 24 may be moved within a slot 25 presently to be described in greater detail. The slot 25 extends through about 180° and is arranged along a helical direction. In the particular device illustrated, the cutters are in normally retracted relationship when the knob 24 is at the foremost end 26 of the slot 25; and in Figure 2 the knob is positioned at the end 26.

For illustrative purposes, I have shown a tube sheet 27 in Figure 2 within which a typical tube 28 is mounted, the end of the tube being rolled as at 29. The purpose of the present device is to cut this tube just within the tube sheet 27, as, for example, at or near the transverse plane 30, so that the tube 28 may thereafter be withdrawn bodily from the condenser or similar installation by grasping the opposite or forward end of the tube and pulling it forwardly, i. e., toward the left as viewed in Figure 2.

In a preferred construction, the housing 20 consists of a cylindrical element provided with the opposite ends 31 and 32, these ends being attached by any suitable means such as studs 33. The spindle is preferably composed of two separable parts. The rear part extends rearwardly from the interiorly threaded end 34 (journaled in the housing head 31) and includes the bifurcated or slotted portion 35, the bearing portion 36 (journaled in the housing head 32), and the rear projecting end 21 previously mentioned. Forwardly of the bearing 36 I prefer to arrange a thrust collar 37. The forward part of the spindle includes the exteriorly threaded portion 38, the bifurcated or slotted portion 39, and the extreme forward tip 40. When the portions 34 and 38 are screwed together, as shown in Figure 2, the spindle rotates as a unit, the separability at the portions 34 and 38 being provided merely for the purpose of enabling a substitute head such as that illustrated in Figure 6 to be employed for tubes of different size. The threaded part 41 of Figure 6, for example, is adapted to engage with the portion 34; but it will be noted that the diameter of the spindle forwardly of the part 41, as shown, for example, at the tip 41' is somewhat greater than the corresponding diameter in Figure 2.

For illustrative purposes, I have shown two oppositely arranged cutters 42 and 43 within the slotted forward end of the spindle of Figure 2. These cutters are so constructed and mounted that they are normally within the confines of the slot, as shown in Figure 2, but are capable of being spread in opposite directions, as shown in Figure 7, so that they emerge radially out of the slot when the actual cutting is to be effected. In the embodiment illustrated, each cutter is provided with a rearwardly extending shank. Thus, the cutters are shown pivoted to the spindle upon the common pivot pin 44; the cutter 42 is provided with the rearwardly extending shank 45; and the cutter 43 is provided with a corresponding shank 46. These shanks extend rearwardly into the housing 20 and are rearwardly divergent, as illustrated. Within the housing they are engaged by axially shiftable means which thereby controls the radial positions of the cutters. For example, I have shown a collar 47 loosely mounted upon the spindle and shiftable axially along the spindle. This collar is most clearly illustrated in Figure 8, and it will be noted that it includes a forward flange 48 and a rear flange 49. The forward flange is provided with the two holes 50 and 51 which are rearwardly divergent and are adapted to accommodate the shanks 45 and 46, respectively.

The rear flange 49 is loosely engaged by the exteriorly threaded member 52 which is shown most clearly in Figure 9 and is preferably constructed in two parts, as illustrated, to facilitate manufacture and assembly. The member 52, when assembled, has the interior annular grooveway 53 which engages the flange 49 to permit rotation of the latter with respect to the member 52. The exterior threads 54 on the member 52 are relatively heavy and of comparatively large pitch, being adapted to mesh with corresponding interior threads 55 provided in the housing 20. The spindle 24 is secured to the member 52, as, for example, by means of the studs or screws 56 shown most clearly in Figure 5, whereby movement of the handle 24 from the forward end 26 of the slot 25 to the rear end 57 thereof, will rotate the member 52 through approximately 180°, the engagement of the screw threads 54 and 55 thereby resulting in an axial or rearward shift of the collar 47 from the position of Figure 2 into that of Figure 7. During this shifting, the cutters will have been rocked into the relationship of Figure 7, in which figure the handle 24 is shown at the rearward end 57 of the slot 25.

In operation, the operative projecting end of the spindle is inserted into the tube to be be cut, as shown in Figure 2. Preferably, the forward surface 58 of the spindle portion 38 is caused to abut against the tube sheet 27, or, more accurately, against the end 29 of the tube 28. The driving power is then set into operation, whereby the spindle is caused to rotate rapidly. While the housing and the entire tool is supported by the operator with one hand, he grasps the knob 24 and moves it rapidly from the position of Figure 2 into that of Figure 7. The weight of the parts is such that very little force is required to accomplish this movement. As a result, the cutters 42 and 43 (which are being rapidly rotated along with the spindle) are suddenly and forcefully caused to move radially into the position of Figure 7. It is to be noted that the present construction affords an exceptionally great leverage for this movement, not only by virtue of the screw thread arrangement 54—55, but also by virtue of the camming action of the inclined walls of the holes 50 and 51 upon the rearwardly divergent shanks 45 and 46.

After the cutting of the tube has been accomplished, a procedure which takes no more than a few seconds, the operator merely returns the handle 24 to its initial position at the forward end 26 of the slot 25. He also disconnects or turns off the driving force and he is then free to withdraw the device from the tube it has just cut and insert it at once into an adjacent tube. By this procedure, hundreds of tubes can be cut in a relatively short time with great facility and ease.

As hereinbefore stated, the device can be used with tubes of differing sizes by simply substituting a different head for the spindle, such as that shown in Figure 6. A complete set of vari-sized heads may be provided with the tool as alternative equipment therefor.

For purposes of lubricating those parts which require it, I provide oil holes at suitable points, as, for example, as shown at 59 and 60. One of the features of my construction lies in the arrangement whereby lubrication may be supplied to the flange 49 of the collar 47. The stem 61 of the handle 24 is provided with a bore 62. This stem has a portion extending into a preformed opening in the member 52, and the lower end of the bore 62 registers with a preformed bore 63 in the member 52, which communicates with the flange 49 as shown most clearly in Figures 2 and 3. Access to the bore 62 may be had by unscrewing the cap 24 of the handle.

Obviously, although I have illustrated two oppositely arranged cutters, one cutter may, under certain circumstances, suffice. Also, if desired, more than two cutters may be arranged, in which case, however, separate pivot pins would be required for the cutters.

Furthermore, although I prefer to form the spindle of two parts, as illustrated, it will be understood that a unitary spindle may be used.

In general, it will be understood that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention, and illustrated its use, what I claim as new and desire to secure by Letters Patent is—

1. In a tube cutter, a threaded housing, a spindle journaled therein and provided with a projecting end adapted to be inserted into the tube to be cut, said projecting end being provided with a longitudinal slot, a cutter normally within the confines of said slot and movably mounted therein for radial emergence therefrom, means within said housing and operatively connected with said cutter for controlling the radial position thereof, a threaded member cooperating with the housing for actuating said controlling means, and means on the exterior of said housing for moving said threaded member.

2. In a tube cutter, a housing, a spindle journaled therein and provided with a projecting end adapted to be inserted into the tube to be cut, said projecting end being provided with a longitudinal slot, a cutter normally within the confines of said slot and movably mounted therein for radial emergence therefrom, said cutter being provided with a shank extending rearwardly into said housing, means within the housing and engaging said shank for controlling the radial position of the cutter, and screw means in the housing and cooperating with the latter for actuating said controlling means.

3. In a tube cutter, a housing, a spindle journaled therein and provided with a projecting end adapted to be inserted into the tube to be cut, said projecting end being provided with a longitudinal slot, a cutter normally within the confines of said slot and pivotally mounted therein for radial movement out of and into said slot, said cutter being provided with a shank extending rearwardly into said housing, means within the housing for rocking said shank and thereby controlling the radial position of the cutter, and screw means within the housing and cooperating with the latter for actuating said controlling means.

4. In a tube cutter, a housing, a spindle journaled therein and provided with a projecting end adapted to be inserted into the tube to be cut, said projecting end being provided with a longitudinal slot, a cutter normally within the confines of said slot and movably mounted therein for radial emergence therefrom, said cutter being provided with a shank extending rearwardly into said housing, axially shiftable means loosely mounted on the spindle within the housing and engaging said shank for controlling the radial position of the cutter by the axial position of said means, and screw means within the housing and cooperating with the latter for shifting said controlling means.

5. In a tube cutter, a housing, a rotatable spindle journaled therein and provided with a projecting end adapted to be inserted into the tube to be cut, said projecting end being provided with a longitudinal slot, a cutter normally within the confines of said slot and pivotally mounted therein for radial movement out of and into said slot, said cutter being provided with a shank extending rearwardly into said housing, axially shiftable means loosely mounted on the spindle within the housing and adapted to rock said shank and thereby control the radial position of the cutter, and screw means loosely engaging said shiftable means and cooperating with the housing and controllable from the exterior of the housing.

6. In a tube cutter, a housing, a rotatable spindle journaled therein and provided with a projecting end adapted to be inserted into the tube to be cut, said projecting end being provided with a longitudinal slot, a cutter normally within the confines of said slot and movably mounted therein for radial emergence therefrom, an axially shiftable collar loosely mounted on the spindle within the housing and operatively connected with said cutter to move the latter radially when the collar is shifted, and screw means loosely engaging said collar and cooperating with the housing and controllable from the exterior of the housing for shifting said collar.

7. In a tube cutter, a housing, a rotatable spindle journaled therein and provided with a projecting end adapted to be inserted into the tube to be cut, said projecting end being provided with a longitudinal slot, a cutter normally within the confines of said slot and movably mounted therein for radial emergence therefrom, said cutter being provided with a shank extending rearwardly into said housing; an axially shiftable collar loosely mounted on the spindle within the housing and engaging said shank to move the cutter radially, through the intermediary of said shank, when the collar is shifted; and screw means loosely engaging said collar and cooperating with the housing and controllable from the exterior of the housing for shifting said collar.

8. In a tube cutter, a housing, a rotatable spindle journaled therein and provided with a projecting end adapted to be inserted into the tube to be cut, said projecting end being provided with a longitudinal slot, a cutter normally within the confines of said slot and pivotally mounted therein for radial movement out of and into said slot, an axially shiftable collar loosely mounted on the spindle within the housing and operatively connected with said cutter to pivot the latter when the collar is shifted, and screw means loosely engaging said collar and cooperating with the housing and controllable from the exterior of the housing for shifting said collar.

9. In a tube cutter, a housing, a rotatable spindle journaled therein and provided with a projecting end adapted to be inserted into the tube to be cut, said projecting end being provided with a longitudinal slot, a cutter normally within the confines of said slot and pivotally mounted therein for radial movement out of and into said slot, said cutter being provided with a shank extending rearwardly into said housing, an axially shiftable collar loosely mounted on the spindle within the housing and adapted to rock said shank and thereby control the radial position of the cutter, and screw means loosely engaging said collar and cooperating with the housing and controllable from the exterior of the housing for shifting said collar.

10. In a tube cutter, a housing, a rotatable spindle journaled therein and provided with a projecting end adapted to be inserted into the tube to be cut, said projecting end being provided with a longitudinal slot, a pair of oppositely arranged, spreadable cutters in said slot and provided with a pair of rearwardly divergent shanks extending into said housing, an axially shiftable collar loosely mounted on the spindle and provided with holes through which said shanks extend, whereby shifting of the collar will control the spreading of the cutters, and screw means loosely engaging said collar and cooperating with the housing and controllable from the exterior of the housing for shifting said collar.

11. In a tube cutter, a cylindrical housing having an interior screw thread, a spindle journaled in the housing along the axis thereof, said spindle having a slotted projecting end adapted to be inserted into the tube to be cut, a cutter normally within the confines of said slot and movably mounted therein for radial emergence therefrom, an axially shiftable collar loosely mounted on said spindle in the housing and operatively connected with said cutter for controlling the radial position thereof, and means for shifting said collar, said means comprising a threaded member loosely engaging said collar and meshing with the interior screw threads of the housing.

12. In a tube cutter, an interiorly threaded housing, a rotatable spindle journaled in the housing and provided with a slotted projecting end adapted to be inserted into the tube to be cut, a cutter normally within the confines of said slot and movably mounted therein for radial emergence therefrom, an axially shiftable collar loosely mounted on said spindle in the housing and operatively connected with said cutter for controlling the radial position thereof, a threaded member in the housing and loosely engaging said collar and cooperating with the threaded housing for shifting said collar, and means on the exterior of said housing for controlling the movements of said threaded member.

13. In a tube cutter, a threaded housing, a spindle journaled therein, a projecting spindle end adapted to be inserted into the tube to be cut and removably associated with the body of the spindle, said projecting end being provided with a longitudinal slot, a cutter pivotally mounted within the confines of said slot for radial emergence therefrom, means loosely mounted on the body of the spindle within the housing and operatively connected with said cutter for controlling the pivoting thereof, and a threaded member cooperating with the housing for actuating said controlling means.

In witness whereof I have signed this specification this 13th day of May, 1931.

ROBERT ARMSTRONG.